United States Patent Office 2,695,901
Patented Nov. 30, 1954

2,695,901

THIOCARBAMYL CYANURYL DERIVATIVES

John J. D'Amico, Charleston, W. Va., assignor to Monsanto Chemical Company, St. Louis, Mo., a corporation of Delaware No Drawing. Application June 23, 1953,
Serial No. 363,692

2 Claims. (Cl. 260—249.5)

The present invention relates to a new compound and to the method of its manufacture.

It is well known that cyanuryl chloride or bromide condenses with salts of dithiocarbamic acid. This reaction is described by Orthner et al., U. S. Patent 2,061,520, who obtained compounds of the general formula

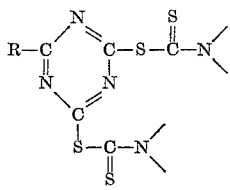

where R represented either another

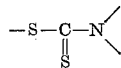

group or —N<.

In accordance with the present invention it has been discovered that the condensation of dimethylamino dimethyl dithiocarbamate and a cyanuryl halide yields neither of these products but on the contrary the compound of the formula

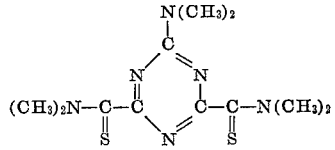

This compound may be obtained by the following procedure: A mixture of 332 grams (2.0 molecular proportions) of dimethylamino dimethyl dithiocarbamate and 2800 ml. of acetone was heated with stirring at 56° C. for 15 minutes in which time a solution resulted. Heat was removed, and a solution of 123 grams (0.66 molecular proportion) of cyanuric chloride in 600 ml. of acetone was added at such a rate from a dropping funnel so as to maintain a gentle reflux of the acetone. The time required for the addition of the cyanuric chloride-acetone solution was one hour. Heat was again applied and the mixture was heated with stirring at 56° C. for five hours. At the end of this period the mixture was filtered hot and the precipitate, which was mainly dimethylamine hydrochloride, was discarded. The volume of the filtrate was concentrated to approximately 100 ml. by vacuum distillation. The residue was filtered, washed with water, and dried in a 50° C. oven. 168 grams of a yellow solid, M. P. 146–148° C., was obtained. After two crystallizations from benzene, the melting point was raised to 163–164° C. Analysis confirmed this compound to be 2-dimethylamino-4,6-bis-(dimethylthiocarbamyl)s-triazine, $C_{11}H_{18}N_6S_2$.

|  | Calcd., percent | Found, percent |
|---|---|---|
| Hydrogen | 6.08 | 6.36 |
| Nitrogen | 28.16 | 28.91 |
| Sulfur | 21.49 | 21.56 |

The molecular weight found by the Rast method (freezing point method with camphor) was 301.0 as compared to a calculated value of 298.4.

The aforedescribed compound is a very active accelerator of vulcanization for both natural synthetic rubber. A rubber stock was compounded comprising

| | Parts by weight |
|---|---|
| Pale crepe rubber | 100.0 |
| Carbon black | 50.0 |
| Zinc oxide | 5.0 |
| Stearic acid | 2.0 |
| Saturated hydrocarbon softener | 3.0 |
| Sulfur | 2.5 |
| 2 - dimethylamino - 4,6 - bis(dimethylthiocarbamyl)-s-triazine | 0.8 |

The stock so compounded was cured in the usual manner by heating in a press for different periods of time at 142° C. The modulus and tensile properties are set forth below:

Table I

| Cure Time in Mins. | Modulus of Elasticity in lbs./in.² at Elongation of 300% | Tensile at Break in lbs./in.² | Ultimate Elongation, percent |
|---|---|---|---|
| 30 | 2,345 | 3,370 | 410 |
| 60 | 2,380 | 3,015 | 380 |
| 90 | 2,305 | 2,825 | 365 |

As illustrative of the accelerating properties in a synthetic rubber stock, a vulcanizable composition was compounded comprising

| | Parts by weight |
|---|---|
| Butadiene-styrene copolymer (GR–S) | 100.0 |
| Carbon black | 50.0 |
| Zinc oxide | 4.0 |
| Saturated hydrocarbon softener | 10.0 |
| Stearic acid | 2.0 |
| Sulfur | 1.75 |
| 2 - dimethylamino - 4,6 - bis(dimethylthiocarbamyl)-s-triazine | 1.2 |

The stock was vulcanized by heating in a press for different periods of time at 144° C. to obtain a vulcanizate having the properties described below:

Table II

| Cure Time in Mins. | Modulus of Elasticity in lbs./in.² at Elongation of 300% | Tensile at Break in lbs./in.² | Ultimate Elongation, percent |
|---|---|---|---|
| 30 | 1,260 | 2,140 | 450 |
| 60 | 1,486 | 2,260 | 440 |
| 90 | 1,730 | 2,404 | 405 |

It is intended to cover all changes and modifications of the examples of the invention herein chosen for purposes of disclosure which do not constitute departures from the spirit and scope of the invention.

What is claimed is:

1. The compound of the formula

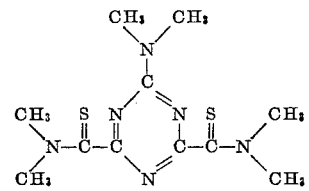

2. The process which comprises heating cyanuryl chloride with dimethylammonium dimethyl dithiocarbamate.

No references cited